(12) United States Patent
Blasl et al.

(10) Patent No.: US 9,989,788 B2
(45) Date of Patent: Jun. 5, 2018

(54) POLARIZATION INDEPENDENT ELECTRO-OPTICALLY INDUCED WAVEGUIDE

(71) Applicant: Fraunhofer-Gesellschaft zur Foerderung der angewandten Forschung e.V., Munich (DE)

(72) Inventors: Martin Blasl, Dresden (DE); Florenta Costache, Dresden (DE); Haldor Hartwig, Dresden (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days. days.

(21) Appl. No.: 15/240,608

(22) Filed: Aug. 18, 2016

(65) Prior Publication Data

US 2016/0357037 A1 Dec. 8, 2016

Related U.S. Application Data

(63) Continuation of application No. PCT/EP2014/053157, filed on Feb. 18, 2014.

(51) Int. Cl.
G02F 1/035 (2006.01)
G02F 1/03 (2006.01)
G02F 1/13 (2006.01)

(52) U.S. Cl.
CPC ............ *G02F 1/035* (2013.01); *G02F 1/0316* (2013.01); *G02F 1/1326* (2013.01); *G02F 2203/06* (2013.01)

(58) Field of Classification Search
CPC ...... G02F 1/035; G02F 1/0316; G02F 1/1326; G02F 2203/06

(Continued)

(56) References Cited

U.S. PATENT DOCUMENTS 3,795,433 A 3/1974 Channin
3,801,185 A 4/1974 Ramaswamy et al.
(Continued)

FOREIGN PATENT DOCUMENTS

WO 03/012532 A2 2/2003
WO 2011/098130 A1 8/2011

OTHER PUBLICATIONS

Jaeger, N.A.F. & Young, L., "Voltage-induced Optical Waveguide Modulator in Lithium Niobate", IEEE Journal of Quantum Electronics, vol. 25(4), Apr. 1989.
(Continued)

*Primary Examiner* — Jerry Blevins
(74) *Attorney, Agent, or Firm* — Dicke, Billig & Czaja, PLLC (57) ABSTRACT

The invention provides an electro-optically induced waveguide including:
   a waveguide layer stack having a core layer including an electro-optic material for guiding light waves; and
   a field generator for generating an electrical field in the core layer, wherein the field generator includes an electrode arrangement having a plurality of electrodes and a voltage supply arrangement for supplying at least two potentials to the electrode arrangement;
   wherein the field generator is configured to induce an electro-optic effect by the generated electrical field in a first cross sectional region of the core layer such that a propagation of transverse-electric polarized light waves is enabled in the first cross sectional region;
   wherein the field generator is configured to induce an electro-optic effect by the generated electrical field in a second cross sectional region of the core layer such that a propagation of transverse-magnetic polarized light waves is enabled in the second cross sectional region; and (Continued)

wherein the first cross sectional region and the second cross sectional region are overlapping in a cross sectional view.

19 Claims, 8 Drawing Sheets

(58) Field of Classification Search
USPC .............................................................. 385/2
See application file for complete search history.

(56) References Cited

U.S. PATENT DOCUMENTS

| | | | |
|---|---|---|---|
| 4,807,952 A | 2/1989 | Jaeger et al. | |
| 4,867,516 A | 9/1989 | Baken | |
| 5,140,652 A | 8/1992 | Diemeer | |
| 2003/0133647 A1* | 7/2003 | Ruschin | G02F 1/035 385/20 |
| 2004/0022492 A1* | 2/2004 | Gunther | G02F 1/0118 385/40 |
| 2007/0086691 A1* | 4/2007 | Toyoda | G02B 6/12011 385/8 |

OTHER PUBLICATIONS

Pyayt, A., et al., "Field-Induced Guiding Optical Devices made from Electro-optic Polymers", Applied Optics, vol. 46(5), Feb. 4, 2010.

* cited by examiner

POLARIZATION INDEPENDENT ELECTRO-OPTICALLY INDUCED WAVEGUIDE

CROSS-REFERENCE TO RELATED APPLICATION

This application is a continuation of copending International Application No. PCT/EP2014/053157, filed Feb. 18, 2014, which is incorporated herein by reference in its entirety.

BACKGROUND OF THE INVENTION

The present invention relates to electro-optically induced waveguides.

Modern fiber optic networks for applications such as optical telecommunication or remote optical sensing include in their architecture a wide variety of different devices, which provide functionalities such as routing, modulating, splitting or intensity attenuation of transmitted optical signals. The so-called electro-optically induced waveguides, in short EOIW, also known as field-induced or voltage-induced waveguide, may serve as key elements in the design of such devices.

The change in the optical properties, i.e. refractive index n(E) of a material, in the presence of an external electrical field describes the electro-optic effect, which is given by the following relation:

$$n(E) = n_0 + \frac{1}{2}n_0^3 rE + \frac{1}{2}n_0^3 sE^2 + \ldots \qquad (1)$$

The linear term in E is referred to as the Pockels effect, with r being the Pockels constant, while the quadratic term in E describes the electro-optic Kerr effect with s being the electro-optic Kerr constant. The Pockels effect occurs and is large in non-centrosymmetrical crystalline media, while the electro-optical Kerr effect is large in certain liquids and ferroelectric ceramics. These materials are called here Pockels materials and electro-optic Kerr materials, respectively.

An electro-optically induced waveguide may consist of a core layer made of a material of large electro-optic constants, which is placed in between two cladding layers of equal or smaller refractive index than the core, as well as in the proximity of an electrode arrangement. The principle of an electro-optically induced waveguides is described for example in [1]. An electrical field applied between the electrodes of the electrode arrangement and across the waveguide layer stack causes a local change in the refractive index of the core material, and, as a result, an optical waveguide is induced. The waveguide can be turned "on" and "off" respectively by means of manipulating the electrical field strength. Scientific publications [2, 3], patents and patent applications [4-8] propose two main designs for the electrode configuration of an electro-optically induced waveguides: an 'in-plane' configuration [4], [6-8], an example is given in FIG. 1A, and an ('out-of-plane' configuration [5, 8], an example is given in FIG. 1B.

Electro-optically induced waveguides may be used for switching, modulation, power splitting, and variable optical attenuating of optical signals transmitted between optical fibers in fiber optic networks. Moreover photonic applications, known by the skilled person, which employ miniaturized optical benches where free space propagation of light is needed, for instance to reduce optical beam divergence etc., can also benefit from devices based on such waveguides.

The problem to be solved is to reduce complexity and costs of a network having at least one electro-optical device with at least one electro-optically induced waveguide.

SUMMARY

According to an embodiment, an electro-optically induced waveguide may have: a waveguide layer stack having a core layer comprising an electro-optic material for guiding light waves; and a field generator for generating an electrical field in the core layer, wherein the field generator comprises an electrode arrangement having a plurality of electrodes and a voltage supply arrangement (30) for supplying at least two potentials ($U_0$, $U_1$, $U_2$) to the electrode arrangement; wherein the field generator is configured to induce an electro-optic effect by the generated electrical field in a first cross sectional region of the core layer such that a propagation of transverse-electric polarized light waves is enabled in the first cross sectional region; wherein the field generator is configured to induce an electro-optic effect by the generated electrical field in a second cross sectional region of the core layer such that a propagation of transverse-magnetic polarized light waves is enabled in the second cross sectional region; wherein the field generator is configured in such way that the coupling efficiency for of transverse-electric polarized light waves and the coupling efficiency for transverse-magnetic polarized light waves are equivalent; and wherein the first cross sectional region and the second cross sectional region are overlapping in a cross sectional view.

Another embodiment may have an electro-optical device for optical telecommunication, fiber-optic sensor networks and/or spectroscopy, such as phase modulator, a polarization independent power or intensity modulator, a polarization filter, a polarization controller, a polarization independent n×m switch, a polarization independent n×m variable power splitter, a polarization independent multiplexer, a channel equalizer, a polarization independent de-multiplexer, wherein the electro-optical device may have an inventive electro-optically induced waveguide.

In one aspect of the present invention the problem is solved by an electro-optically induced waveguide comprising:

a waveguide layer stack having a core layer comprising an electro-optic material for guiding light waves; and a field generator for generating an electrical field in the core layer, wherein the field generator comprises an electrode arrangement having a plurality of electrodes and a voltage supply arrangement for supplying at least two potentials to the electrode arrangement;

wherein the field generator is configured to induce an electro-optic effect by the generated electrical field in a first cross sectional region of the core layer such that a propagation of transverse-electric polarized light waves is enabled in the first cross sectional region;

wherein the field generator is configured to induce an electro-optic effect by the generated electrical field in a second cross sectional region of the core layer such that a propagation of transverse-magnetic polarized light waves is enabled in the second cross sectional region;

wherein the field generator is configured in such a way that the coupling efficiency for transverse-electric polarized light waves and the coupling efficiency for transverse-magnetic polarized light waves are equivalent; and wherein the first cross sectional region and the second cross sectional region are overlapping in a cross sectional view or plane.

The general polarization state of a light wave may be described as a superposition of two linearly polarized light waves, polarized perpendicular to each other. These two linearly polarized light waves are generally referred to as the transverse-electric polarized light wave (TE-wave), also known as s-polarized wave, and the transverse-magnetic polarized light wave (TM-wave), also known as p-polarized light wave.

The formulation that the coupling efficiency for of transverse-electric polarized light waves and the coupling efficiency for transverse-magnetic polarized light waves are equivalent means that the coupling efficiencies are the same or nearly the same.

The present invention provides an electro-optically induced waveguide, wherein transverse-electric polarized light waves and transverse-magnetic polarized light waves may be simultaneously guided with equivalent coupling efficiency so that the electro-optically induced waveguide according to the invention may guide light of any state of polarization. Therefore, the invention provides a polarization independent electro-optically induced waveguide.

By providing a polarization independent electro-optically induced waveguide, complexity and costs of electro-optical devices having at least one electro-optically induced waveguide may be reduced.

At an electro-optically induced waveguide according to the invention the TE mode and the TM mode of a light wave may exist simultaneously, may have a similar intensity profile and may be spatially overlapped so that both modes of a light wave transferred through an optical fiber may be coupled into the waveguide equally. The mode coupling coefficients between the optical fiber and the electro-optically induced waveguide and the propagation losses in the electro-optically induced waveguide may be balanced or matched together in such a way that the overall insertion loss for the two modes turn out to be equal.

In contrast to that, the electro-optically induced waveguides according to the conventional technology, as described above, have optical properties which depend on the polarization of an incoming light wave. In particular, the electrical field applied across the core layer, as described above, induces additional birefringence in the electro-optical material. This causes that the propagation behavior of a light wave along the waveguide is dependent on its polarization state, i.e. the transmission characteristics of TE and TM polarized light waves through the waveguide according to the conventional technology are different.

The present invention provides polarization insensitive electro-optically induced waveguides, wherein special electrode arrangements are employed. Such electrode arrangements are discussed below in more details. The polarization independent electro-optically induced waveguides according to the present invention include two or more electrodes placed either on one side or on both sides of the waveguide layer stack such that the applied electrical field distribution across the waveguide layer stack permits the coexistence of the TE mode and the TM mode simultaneously with either identical or variable intensity mode profiles.

The electro-optically induced waveguides according to the invention may be fabricated in a straightforward and cost effective manner using wafer level planar technology methods, this allowing furthermore integration with other devices as well as scalability, which is of advantage over most optomechanical components manufacturing. Operation stability and reliability is warranted by the absence of moving parts, which is an advantage over technologies based on micro-electro-mechanical-systems (MEMS).

Manufacturing methods may be based on silicon or glass wafer level technologies.

According to another aspect of the present invention, a method for fabrication of the polarization independent electro-optically induced waveguide may include: 1. Structuring of silicon or glass wafer; structures such as V-grooves for positioning of optical fibers, tapers, microlenses and cavities to be filled with liquids, liquid crystals etc.; these may be manufactured via etching methods; 2. Metallic electrode deposition and electrode structuring, which may be manufactured via lithography methods; the method may further include repeating electrode deposition and structuring, alternating with deposition of insulating layers; 3. Cladding deposition for instance if this is made of glass, polymer etc. or, if made of liquids or liquid crystals, filling of a suitably structured cavity; 4. Core deposition or filling of a suitably structured cavity with liquids or liquid crystals, brought in their isotropic phase via heating; 5. Wafer bonding and dicing. 6. Electrical contacting via wire bonding, additional contact layers, through-hole bonding in the wafer backplane or a combination of these; 6. Optical fiber coupling.

According to an embodiment of the invention at least one electrode of the electrodes, advantageously all electrodes, are transparent electrodes, wherein at least one electrode of the transparent electrodes, advantageously all transparent electrodes are arranged directly adjacent to the core layer and/or at least one electrode of the transparent electrodes, advantageously all transparent electrodes are arranged within the core layer. For various electrode configurations, electrodes, which are optically transparent at the wavelength range of the application may be used and positioned in direct contact with the core layer or within the core layer in order to obtain waveguides with low attenuation loss.

According to an embodiment of the invention the field generator is configured in such way that in a cross sectional view the electrical field in a first cross sectional area of the core layer is orientated transverse to the waveguide layer stack, that the electrical field in a second cross sectional area of the core layer located in a first direction parallel to the waveguide layer stack is orientated along the waveguide layer stack and that the electrical field in a third cross sectional area of the core layer located in a second direction opposite to the first direction and parallel to the waveguide layer stack is orientated along the waveguide layer stack. These features ensure that the first cross sectional region and the second cross sectional region will overlap in an easy way.

According to an embodiment of the invention at least some of the electrodes, advantageously all electrodes, are planar and arranged parallel to the core layer. By these features costs for manufacturing the electro-optically induced waveguide are reduced.

According to an embodiment of the invention the electrodes are arranged in a cross sectional view symmetrically with respect to an axis perpendicular to the core layer. By these features a propagation symmetrical with respect to the axis perpendicular to the core layer of the light wave may be ensured.

According to an embodiment of the invention the electrodes are arranged in a cross sectional view symmetrically with respect to an axis parallel to the core layer. By these features a propagation symmetrical with respect to the axis parallel to the core layer of the light wave may be ensured.

According to an embodiment of the all electrodes are arranged on the same side of the core layer invention in a cross sectional view. By this feature the waveguide may be manufactured in an easy way.

According to an embodiment of the invention the electrode arrangement comprises a group of three of said electrodes arranged in one layer, wherein a first of said potentials is applied to the one of said three electrodes arranged in the middle and a second of said potentials is applied to the other two electrodes of the group. By these features may be ensured that the electrical field in a first cross sectional area of the core layer is orientated transverse to the waveguide layer stack, that the electrical field in a second cross sectional area of the core layer located in a first direction parallel to the waveguide layer stacks is orientated along the waveguide layer stack and that the electrical field in a third cross sectional area of the core layer located in a second direction opposite to the first direction and parallel to the waveguide layer stack is orientated along the waveguide layer stack.

According to an embodiment of the invention the electrode arrangement comprises two of said electrodes arranged in different layers on the same side of the core layer, wherein the electrode facing away from the core layer has in a cross sectional view a larger extension in a direction parallel to the core layer than the electrode facing towards the core layer. By these features may be ensured that the electrical field in a first cross sectional area of the core layer is orientated transverse to the waveguide layer stack, that the electrical field in a second cross sectional area of the core layer located in a first direction parallel to the waveguide layer stack is orientated along the waveguide layer stack and that the electrical field in a third cross sectional area of the core layer located in a second direction opposite to the first direction and parallel to the waveguide layer stack is orientated along the waveguide layer stack.

According to an embodiment of the invention the electrode arrangement comprises at least two electrodes of said electrodes arranged in different layers on a first side of the core layer and at least two electrodes of said electrodes arranged in different layers on a second opposite side of the core layer, wherein the electrode facing away from the core layer have in a cross sectional view a larger extension in at least one direction parallel to the core layer than the electrode facing towards the core layer. By these features may be ensured that the electrical field in a first cross sectional area of the core layer is orientated transverse to the waveguide layer stack, that the electrical field in a second cross sectional area of the core layer located in a first direction parallel to the waveguide layer stack is orientated along the waveguide layer stack and that the electrical field in a third cross sectional area of the core layer located in a second direction opposite to the first direction and parallel to the waveguide layer stack is orientated along the waveguide layer stack.

According to an embodiment of the invention the electrode arrangement comprises a group of three of said electrodes, wherein each of the electrodes of the group is supplied with one of said potentials, wherein at least two of the potentials of the electrodes are controllable, wherein a coupling efficiency for transverse-electric polarized light waves is a function of the two potentials and a coupling efficiency for transverse-magnetic polarized light waves is a function of the two potentials different from the function for the transverse-electric polarized light waves.

By these features the transmitted power in the electro-optically induced waveguide may be controlled for TE-polarized light waves and for TM-polarized light waves independently.

Moreover these features permit control of the polarization of a light wave, which is important for polarization controller devices.

According to an embodiment of the invention the core layer comprises thermotropic liquid crystals in their mesogenic state, thermotropic liquid crystals in their isotropic phase and their mixtures, polymer stabilized liquid crystals, cholesteric liquid crystals; crystals, ceramics and optoceramics, such as $LiTaO_3$, $LiNbO_3$, CdS, ZnO, $KNbO_3$, KDP, KTP, GaAs, $BaTiO_3$, $KTaO_3$, PLZT, poled electro-optical polymers, such as host-guest, side-chain polymers, such as disperse red (DR) or disperse orange (DO), optically isotropic liquids, such as nitrotoluene ($C7H7$—$N02$) and nitrobenzene ($C6H5$—$N02$).

According to an embodiment of the invention the waveguide layer stack comprises a first cladding layer and a second cladding layer, wherein the core layer is arranged between the first cladding layer and the second cladding layer. Cladding materials may be materials transparent over the spectral range of the application (visible or infrared) like glass, polymers etc.

According to an embodiment of the invention the core layer has a refractive index equal or higher than the first cladding layer and/or the second cladding layer.

According to an embodiment of the invention the first cladding layer and/or the second cladding layer comprise an electro-optical material. Electro-optical materials are for example liquid crystals, electro-optical polymers etc.

According to an embodiment of the invention the first cladding layer and/or the second cladding layer comprises thermotropic liquid crystals in their mesogenic state, thermotropic liquid crystals in their isotropic phase and their mixtures, polymer stabilized liquid crystals, cholesteric liquid crystals; crystals, ceramics and optoceramics, such as $LiTaO_3$, $LiNbO_3$, CdS, ZnO, $KNbO_3$, KDP, KTP, GaAs, $BaTiO_3$, $KTaO_3$, PLZT, poled electro-optical polymers, such as host-guest, side-chain polymers, such as disperse red (DR) or disperse orange (DO), optically isotropic liquids, such as nitrotoluene ($C7H7$—$N02$) and nitrobenzene ($C6H5$—$N02$).

Another aspect of the invention relates to an electro-optical device for optical telecommunication, fiber-optic sensor networks and/or spectroscopy, such as phase modulator, a polarization independent power or intensity modulator, a polarization filter, a polarization controller, a polarization independent n×m switch, a polarization independent n×m variable power splitter, a polarization independent multiplexer, a channel equalizer, a polarization independent de-multiplexer, wherein the electro-optical device comprises an electro-optically induced waveguide according to the invention.

According to an embodiment of the invention the electro-optical device is a polarization independent n×m switch, wherein at least one input path comprises a first waveguide according to the invention and wherein at least one output path comprises a further waveguide according to the invention. Herein n denotes the number of input paths and m the number of output paths.

BRIEF DESCRIPTION OF THE DRAWINGS

Embodiments of the present invention will be detailed subsequently referring to the appended drawings, in which.

DETAILED DESCRIPTION OF THE INVENTION

Figure 1A:
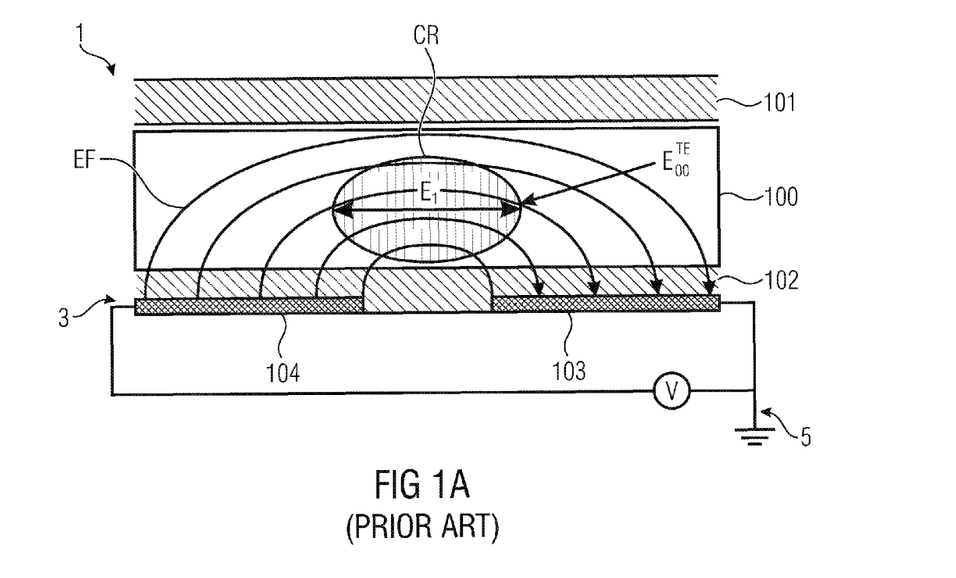
FIG. 1A illustrates a first embodiment of an electro-optically induced waveguide according to the conventional technology in a schematic cross sectional view.

FIG. 1A illustrates a first embodiment of an electro-optically induced waveguide 1 having an electrode arrangement 3 and of voltage supply arrangement 5 according to the conventional technology in a schematic cross sectional view. FIG. 1A shows an "in-plane" configuration of an electro-optically induced waveguide 1, whereby the planar electrodes 103, 104 are placed on one side of the waveguide layer stack 100, 101, 102 consisting of a core layer 100 made of an electro-optical material and two cladding layers 101, 102. An electrical field EF applied between these electrodes 103, 104 induces an additional birefringence in a cross sectional region CR of the core layer 100. In this case, for most materials, the fundamental mode $E_{00}$ of the induced waveguide is TE-polarized. $E_1$ depicts a plane in which the electrical component of the TE-polarized light wave is oscillating.

Figure 1B:
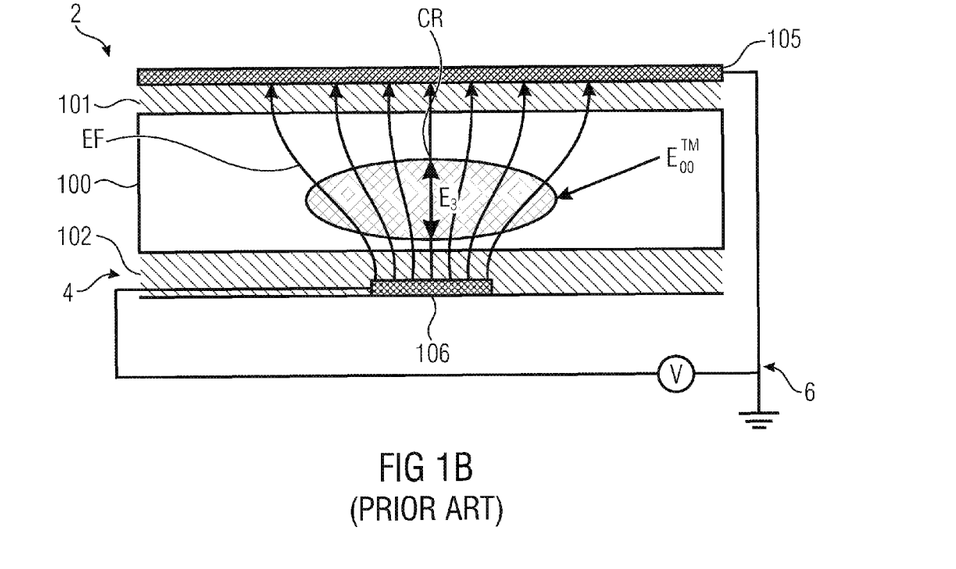
FIG. 1B illustrates a second embodiment of an electro-optically induced waveguide according to the conventional technology in a schematic cross sectional view.

FIG. 1B illustrates a second embodiment of an electro-optically induced waveguide 2 having an electrode arrangement 4 and a voltage supply arrangement 6 according to the conventional technology in a schematic cross sectional view. FIG. 1B presents an "out-of-plane" configuration of an electro-optically induced waveguide 1, whereby the electrical field EF is applied between the electrodes 105, 106, which are positioned on both sides of the waveguide layer stack 100, 101, 102. The fundamental mode $E_{00}$ of the induced waveguide is in this case, and for most materials, TM-polarized. $E_3$ depicts a plane in which the electrical component of the TM-polarized light wave is oscillating.

The basic polarization dependent electro-optically induced waveguide properties depend on the electro-optical material. This fact can be explained on the basis of two materials: $LiNbO_3$ known by the skilled person to exhibit large Pockels constants and optically isotropic liquids having large electro-optic Kerr constants.

In the electro-optically induced waveguide configuration cross section from FIG. 1B, it is now assumed that the electro-optical core 100 is made of $LiNbO_3$. The orientation of the 100 $LiNbO_3$ crystal should be chosen such that the crystalline c-axis is parallel to the symmetry axis of the waveguide cross section. Furthermore, it is considered in a first approximation that the electrical field between the electrodes 105 and 106 is homogeneous. In this case, the induced birefringence is satisfactorily described by the independent Pockels constants $r_{13}$ and $r_{33}$. The relation between these two constants is for this case $r_{13}/r_{33} \approx 0.3$. This implies that in order to produce an electro-optically induced waveguide with the same transmitted power (attenuation loss), a three times higher voltage (electrical field strength) may be applied between electrodes for an incoming TE polarized light as compared to an incoming TM polarized light. Hereby it is shown that the electro-optically induced waveguide can in principle simultaneously guide both TE and TM polarized light waves. However, since the optical properties of the waveguide are different for the two polarization directions, the optical performance of the electro-optically induced waveguide (i.e. transmitted power) will be depending on the polarization state of the incoming light wave.

The electro-optically induced waveguide configuration cross section from FIG. 1B is again considered, wherein this time the electro-optical core 100 is made of an optically isotropic liquid. In this type of materials the electro-optical Kerr effect is dominant. Under the approximation of a homogeneous electrical field between the electrodes 105 and 106, the induced birefringence is again adequately described by the electro-optic Kerr constants $s_{13}$ and $s_{33}$. The relation between these constants in this second case is $s_{13}/s_{33} = -0.5$. Due to this relation as well as the quadratic dependence on the electrical field on the induced birefringence, in the electro-optically induced waveguide from FIG. 1B only the TM polarized light (mode) is guided, whereby the TE polarized light is radiated away.

Figure 1C:
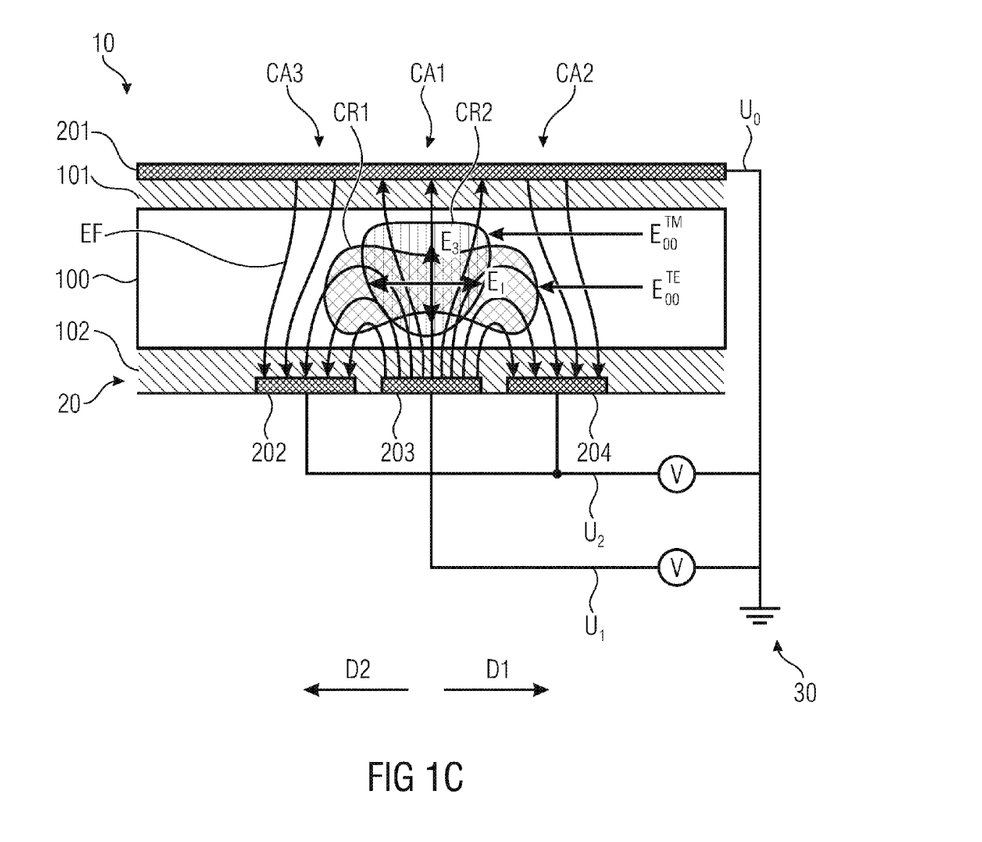
FIG. 1C illustrates a first embodiment of an electro-optically induced waveguide according to the invention in a schematic cross sectional view.

FIG. 1C illustrates a first embodiment of an electro-optically induced waveguide according to the invention in a schematic cross sectional view. FIG. 1 depicts an electro-optically induced waveguide 10 comprising:

a waveguide layer stack having a core layer 100 comprising an electro-optic material for guiding light waves; and a field generator for generating an electrical field EF in the core layer 100, wherein the field generator comprises an electrode arrangement 20 having a plurality of electrodes 201, 202, 203, 204 and a voltage supply arrangement for supplying at least two potentials $U_0$, $U_1$, $U_2$ to the electrode arrangement 20;

wherein the field generator is configured to induce an electro-optic effect by the generated electrical field EF in a first cross sectional region CR1 of the core layer 100 such that a propagation of transverse-electric polarized light waves is enabled in the first cross sectional region CR1;

wherein the field generator is configured to induce an electro-optic effect by the generated electrical field EF in a second cross sectional region CR2 of the core layer 100 such that a propagation of transverse-magnetic polarized light waves is enabled in the second cross sectional region CR2; and wherein the field generator is configured in such way that the coupling efficiency CEE for transverse-electric polarized light waves and the coupling efficiency CEM for transverse-magnetic polarized light waves are equivalent; and wherein the first cross sectional region CR1 and the second cross sectional region CR2 are overlapping in a cross sectional view.

The present invention provides an electro-optically induced waveguide 10, wherein transverse-electric polarized light waves and transverse-magnetic polarized light waves may be simultaneously guided with the same coupling efficiency CEM CEE so that the electro-optic waveguide 10 according to the invention may guide light of any state of polarization. Therefore, the invention provides a polarization independent electro-optically induced waveguide 10.

By providing a polarization independent electro-optically 10 induced waveguide, complexity and costs of electro-optical devices having at least one electrooptically induced waveguide 10 may be reduced.

At an electro-optically induced waveguide according to the invention the TE mode and the TM mode of light wave may propagate simultaneously, may have a similar intensity profile and may be spatially overlapped so that both modes of a light wave transferred through an optical fiber may be coupled into the waveguide equally. The mode coupling coefficients between the optical fiber and the electro-optically induced waveguide and the propagation losses in the electro-optically induced waveguide may be balanced in such a way that the overall insertion loss for the two modes turn out to be equal.

In contrast to that the electro-optically induced waveguides according to the conventional technology as described above have optical properties which depend on the polarization of an incoming light wave. In particular, the electrical field applied across the core layer, as described above, induces additional birefringence in the electro-optical material. This causes that the propagation behavior of a light wave along the waveguide is dependent on its polarization state, i.e. the transmission characteristics of TE and TM polarized light waves through the waveguide according to the conventional technology are different.

The present invention provides polarization insensitive electro-optically induced waveguides 10, wherein special electrode arrangements 20-28 are employed. Such electrode arrangements 20-28 are discussed below in more detail. The polarization independent electro-optically induced waveguides 10 according to the present invention include two or more electrodes 201-217 placed either on one side or on both sides of the waveguide layer stack 100, 101, 102 such that the applied electrical field distribution across the waveguide layer stack 100, 101, 102 permits the coexistence of the TE mode and the TM mode simultaneously with either identical or variable intensity mode profiles.

The electro-optically induced waveguides 10 according to the invention may be fabricated in a straightforward and cost effective manner using wafer level planar technology methods, this allowing furthermore integration with other devices as well as scalability, which is of advantage over most optomechanical components manufacturing. Operation stability and reliability is warranted by the absence of moving parts, which is an advantage over technologies based on micro-electro-mechanical-systems (MEMS).

Manufacturing methods may be based on silicon or glass wafer level technologies.

According to another aspect of the present invention, a method for fabrication of the polarization independent electro-optically induced waveguide 10 may include: 1. Structuring of silicon or glass wafer; structures such as V-grooves for positioning of optical fibers, tapers, microlenses and cavities to be filled with liquids and liquid crystals etc.; these may be manufactured via etching methods; 2. Metallic electrode deposition and electrode structuring, which may be manufactured via lithography methods; the method may further include repeating electrode deposition and structuring alternating with deposition of insulating layers; 3. Cladding deposition for instance if this is made of glass, polymer etc. or, if made of liquid crystals, filling of a suitably structured cavity; 4. Core deposition or filling of a suitably structured cavity with liquids or liquid crystals, brought in their isotropic phase via heating; 5. Wafer bonding and dicing. 6. Electrical contacting via wire bonding, additional contact layers, through-hole bonding in the wafer backplane or a combination of these; 6. Optical fiber coupling.

According to an embodiment of the invention the field generator is configured in such way that in a cross sectional view the electrical field EF in a first cross sectional area CA1 of the core layer 100 is orientated transverse to the waveguide layer stack 100, 101, 102, that the electrical field EF in a second cross sectional area CA2 of the core layer 100 located in a first direction D1 parallel to the waveguide layer stack 100, 101, 102 is orientated along the waveguide layer stack 100, 101, 102 and that the electrical field EF in a third cross sectional area CA3 of the core layer 100 located in a second direction D2 opposite to the first direction D1 and parallel to the waveguide layer stack 100, 101, 102 is orientated along the waveguide layer stack 100, 101, 102. These features ensure that the first cross sectional region CR1 and the second cross sectional region CR2 will overlap in an easy way.

According to an embodiment of the invention at least some of the electrodes 201, 202, 203, 204 advantageously all electrodes 201, 202, 203, 204 are planar and arranged parallel to the core layer 100. By these features costs for manufacturing the electro-optically induced waveguide 10 are reduced.

According to an embodiment of the invention the electrode arrangement 20 comprises a group of three electrodes 202, 203, 204 of said electrodes 201, 202, 203, 204 arranged in one layer, wherein a first of said potentials $U_1$ is applied to the one electrode 203 of said three electrodes 202, 203, 204 arranged in the middle and a second of said potentials $U_2$ is applied to the other two electrodes 202, 204 of the group. By these features may be ensured that the electrical field EF in a first cross sectional area CA1 of the core layer 100 is orientated transverse to the waveguide layer stack 100, 101, 102, that the electrical field EF in a second cross sectional area CA2 of the core layer 100 located in a first direction D1 parallel to the waveguide layer stacks 100, 101, 102 is orientated along the waveguide layer stack 100, 101, 102 and that the electrical field EF in a third cross sectional area CA3 of the core layer 100 located in a second direction D2 opposite to the first direction D1 and parallel to the waveguide layer stack 100, 101, 102 is orientated along the waveguide layer stack 100, 101, 102.

According to an embodiment of the invention the electrode arrangement 20 comprises a group of three of said electrodes 201, 202, 203, wherein each of the electrodes 201, 202, 203 of the group is supplied with one of said potentials $U_0$, $U_1$, $U_2$, wherein at least two potentials $U_1$, U2 of the potentials $U_0$, $U_1$, U2 of the electrodes 201, 202, 203 are controllable, a coupling efficiency CEE for transverse-electric polarized light waves is a function of the two potentials $U_1$, $U_2$ and a coupling efficiency CEM for transverse-magnetic polarized light waves is a function of the two potentials $U_1$, U2 different from the function for the transverse-electric polarized light waves. See also FIG. 4.

By these features the transmitted power in the electro-optically induced waveguide 10 may be controlled for TE-polarized light waves and for TM-polarized light waves independently.

Moreover these features permit to control the polarization of a light wave, which is important for polarization controller devices.

According to an embodiment of the invention the core layer 100 comprises thermotropic liquid crystals in their mesogenic state, thermotropic liquid crystals in their isotropic phase and their mixtures, polymer stabilized liquid crystals, cholesteric liquid crystals; crystals, ceramics and optoceramics, such as $LiTaO_3$, $LiNbO_3$, CdS, ZnO, $KNbO_3$, KDP, KTP, GaAs, $BaTiO_3$, KTaO3, PLZT, poled electro-optical polymers, such as host-guest, side-chain polymers, such as disperse red (DR) or disperse orange (DO), optically isotropic liquids, such as nitrotoluene (C7H7—N02) and nitrobenzene (C6H5—N02).

According to an embodiment of the invention the waveguide layer stack 100, 101, 102 comprises a first cladding layer 101 and a second cladding layer 102, wherein the core layer 100 is arranged between the first cladding layer 101 and the second cladding layer 102. Cladding materials may be materials transparent over the spectral range of the application (visible or infrared) like glass, polymers etc.

According to an embodiment of the invention the core layer 100 has a refractive index equal or higher than the first cladding layer 101 and/or the second cladding layer 102.

According to an embodiment of the invention the first cladding layer 101 and/or the second cladding layer 102 comprise an electro-optical material. Electro-optical materials are for example liquid crystals, electro-optical polymers etc.

According to an embodiment of the invention the first cladding layer 101 and/or the second cladding layer 102 comprise thermotropic liquid crystals in their mesogenic state, thermotropic liquid crystals in their isotropic phase and their mixtures, polymer stabilized liquid crystals, cholesteric liquid crystals; crystals, ceramics and optoceramics, such as $LiTaO_3$, $LiNbO_3$, CdS, ZnO, $KNbO_3$, KDP, KTP, GaAs, $BaTiO_3$, $KTaO_3$, PLZT, poled electro-optical polymers, such as host-guest, side-chain polymers, such as disperse red (DR) or disperse orange (DO), optically isotropic liquids, such as nitrotoluene (C7H7—N02) and nitrobenzene (C6H5—N02).

FIG. 1C presents an example (embodiment) of the present invention, which comprises a combined configuration with one planar electrode 201 on one side of the waveguide layer stack 100, 101, 102 and three planar electrodes 202, 203, 204 on the other side of the stack. The position and shape of the electrodes 201, 202, 203, 204 as well as the applied electrical field EF ensure hereby the coexistence of spatially overlapped TE and TM modes. The corresponding estimated mode profiles CR1 for TE modes and CR2 for TM modes are also presented to emphasize this aspect.

Figure 2A:
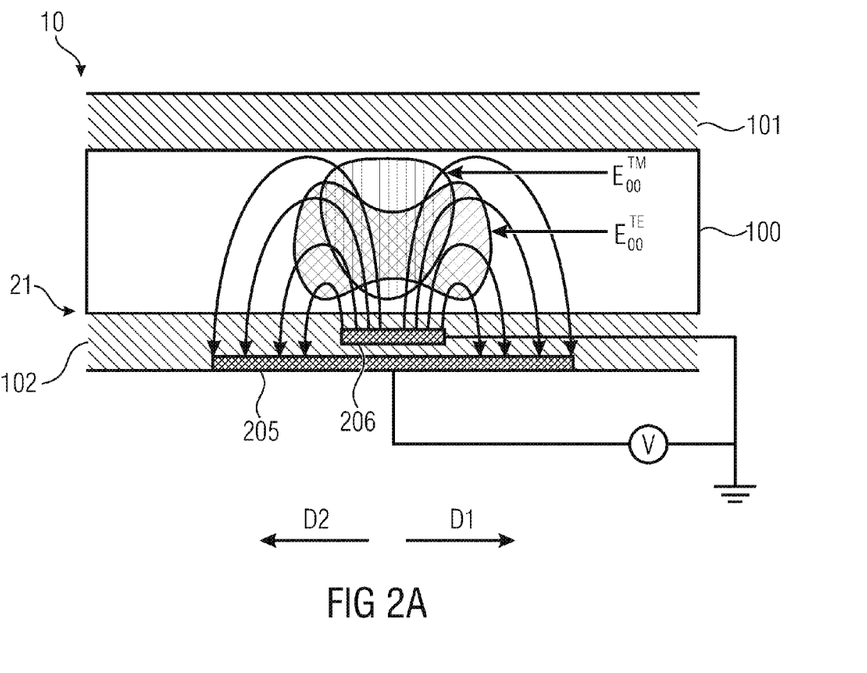
FIG. 2A illustrates a second embodiment of an electro-optically induced waveguide according to the invention in a schematic cross sectional view.

FIG. 2A illustrates a second embodiment of an electro-optically induced waveguide 10 according to the invention in a schematic cross sectional view, which is a modified electrode arrangement 21.

According to an embodiment of the invention the electrode arrangement 10 comprises two electrodes 205, 206 of said electrodes 205, 206 arranged in different layers on the same side of the core layer 100, wherein the electrode 206 facing away from the core layer has in a cross sectional view a larger extension in a direction D1, D2 parallel to the core layer 100 than the electrode 205 facing towards the core layer 100. By these features may be ensured that the electrical field EF in a first cross sectional area CA1 of the core layer 100 is orientated transverse to the waveguide layer stack 100, 101 102, that the electrical field EF in a second cross sectional area CA2 of the core layer 100 located in a first direction D1 parallel to the waveguide layer stack 100, 101 102 is orientated along the waveguide layer stack 100, 101 102 and that the electrical field EF in a third cross sectional area CA3 of the core layer 100 located in a second direction D2 opposite to the first direction D1 and parallel to the waveguide layer stack 100, 101 102 is orientated along the waveguide layer stack 100, 101 102.

FIG. 2A presents another embodiment of the present invention, which comprises a configuration with two electrodes 201, 202. These are placed parallel to one another on the same side of the waveguide stack 100, 101, 102.

Figure 2B:
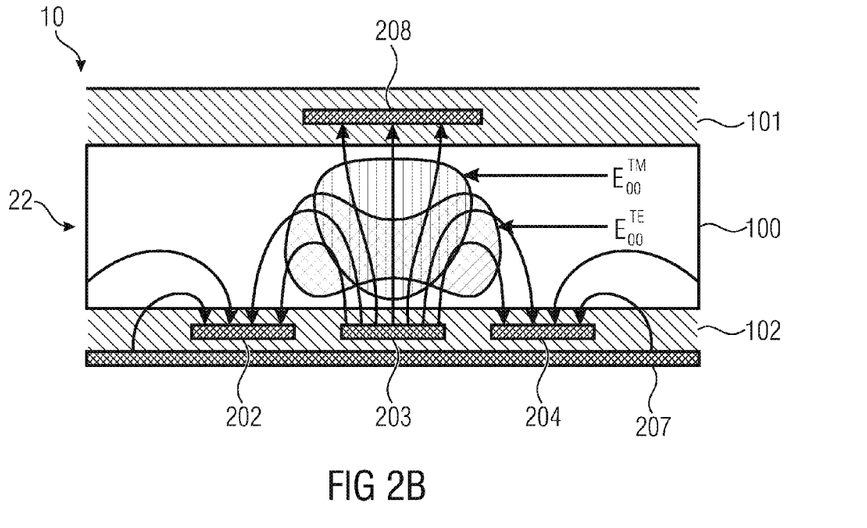
FIG. 2B illustrates a third embodiment of an electro-optically induced waveguide according to the invention in a schematic cross sectional view.

FIG. 2B illustrates a third embodiment of an electro-optically induced waveguide according to the invention in a schematic cross sectional view, which has a modified electrode arrangement 22. The electrode arrangement 22 consists of the electrodes 202, 203, 204 which are arranged in a plane on the first side of the core layer 100, the electrode 207 which is arranged in another plane on the first side of the core layer 100 and the electrode 208 arranged on the second side of the core layer 100.

Figure 2C:
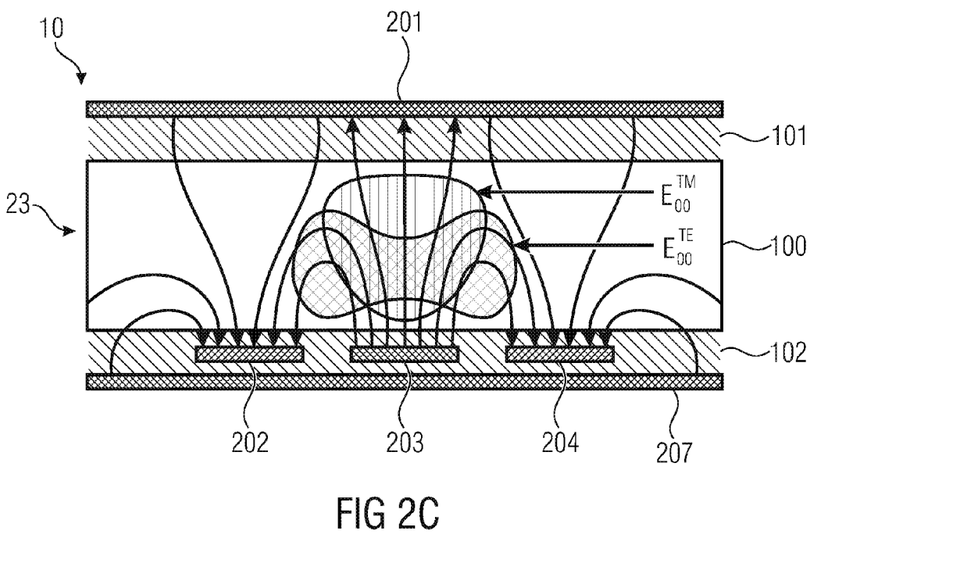
FIG. 2C illustrates a fourth embodiment of an electro-optically induced waveguide according to the invention in a schematic cross sectional view.

FIG. 2C illustrates a fourth embodiment of an electro-optically induced waveguide according to the invention in a schematic cross sectional view which has a modified electrode arrangement 23. The electrode arrangement 23 consists of the electrodes 202, 203, 204 which are arranged in a plane on the first side of the core layer 100, the electrode 207 which is arranged in another plane on the first side of the core layer 100 and the electrode 201 arranged on the second side of the core layer 100, wherein the electrode 201 is smaller than the electrode 208 of the electrode arrangement 22.

Figure 2D:
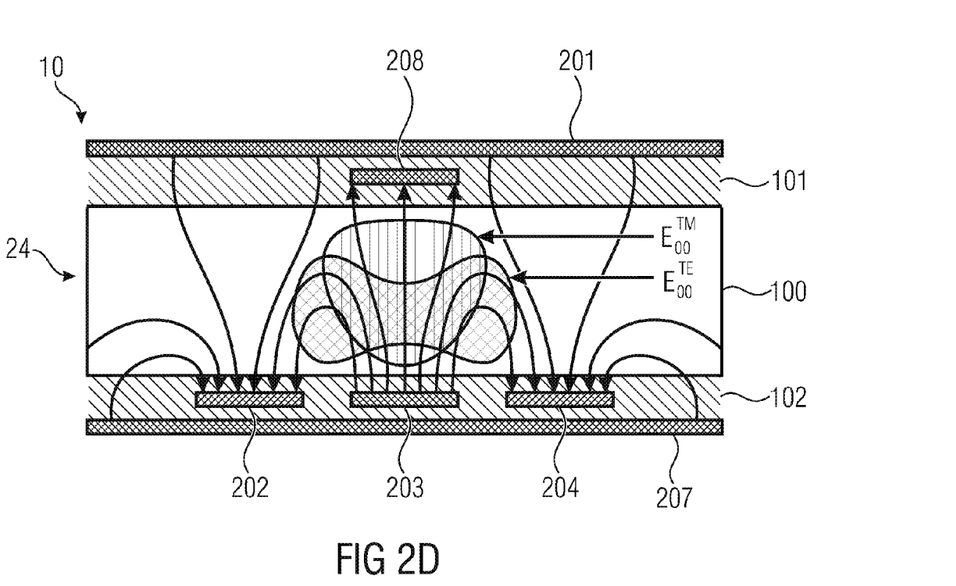
FIG. 2D illustrates a fifth embodiment of an electro-optically induced waveguide according to the invention in a schematic cross sectional view.

FIG. 2D illustrates a fifth embodiment of an electro-optically induced waveguide according to the invention in a schematic cross sectional view which has a modified electrode arrangement 24. The electrode arrangement 24 is a combination of the electrode arrangements 22 and 23, wherein the electrodes 201 and 208 are located in different layers on a first side of the core layer 100 and wherein the electrodes 202, 203, 204 and the electrode 207 are located in different layers on a second side of the core layer 100.

According to an embodiment of the invention the electrode arrangement 20-28 comprises at least two electrodes 201, 208 of said electrodes 201-217 arranged in different layers on a first side of the core layer 100 and at least two electrodes 202, 203, 204, 207 of said electrodes 201-217 arranged in different layers on a second side of the core layer 100, wherein the electrode 201, 207 facing away from the core layer 100 have in a cross sectional view a larger extension in at least one direction D1, D2 parallel to the core layer 100 than the electrode 202, 203, 204, 208 facing towards the core layer 100. By these features may be ensured that the electrical field in a first cross sectional area of the core layer is orientated transverse to the waveguide layer stack, that the electrical field in a second cross sectional area of the core layer located in a first direction parallel to the waveguide layer stack is orientated along the waveguide layer stack and that the electrical field in a third cross sectional area of the core layer located in a second direction opposite to the first direction and parallel to the waveguide layer stack is orientated along the waveguide layer stack.

Figure 3A:
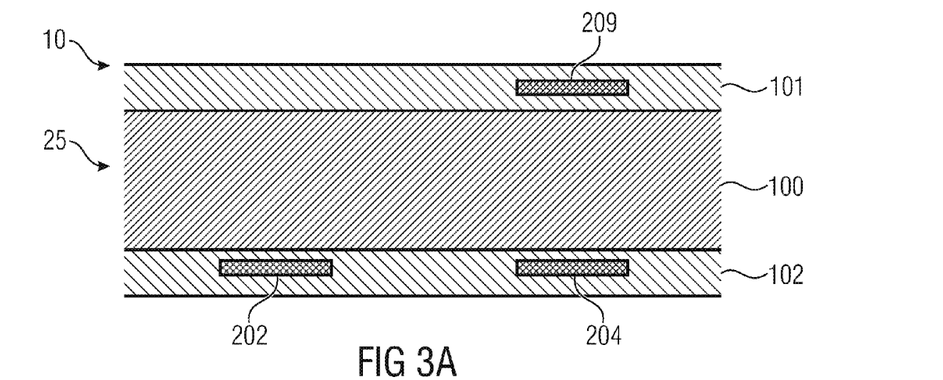
FIG. 3A illustrates a sixth embodiment of an electro-optically induced waveguide according to the invention in a schematic cross sectional view.

FIG. 3A illustrates a sixth embodiment of an electro-optically induced waveguide according to the invention in a schematic cross sectional view, which has a modified electrode arrangement 25, which is asymmetrical.

Figure 3B:
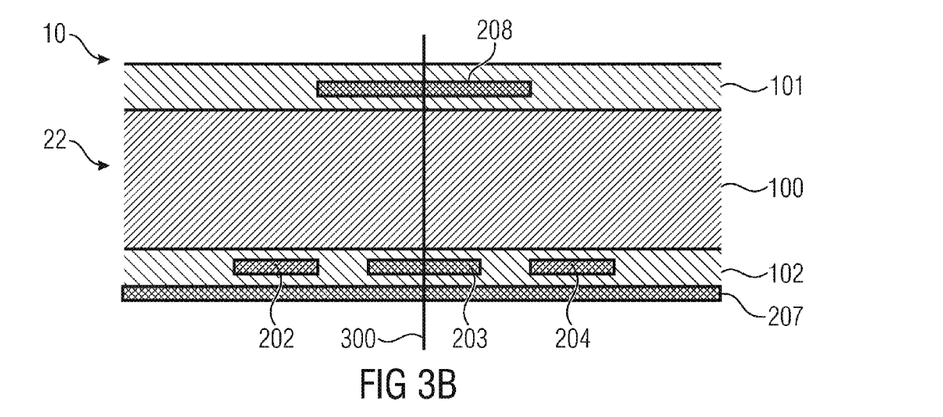
FIG. 3B illustrates a seventh embodiment of an electro-optically induced waveguide according to the invention in a schematic cross sectional view.

FIG. 3B illustrates a seventh embodiment of an electro-optically induced waveguide according to the invention in a schematic cross sectional view which has the electrode arrangement 22 also shown in FIG. 2C. According to an embodiment of the invention the electrodes 202 203, 204, 207, 208 are arranged in a cross sectional view symmetrically with respect to an axis 300 perpendicular to the core layer 100. By these features light wave propagation symmetrical with respect to the axis 300 perpendicular to the core layer 100 may be ensured.

Figure 3C:
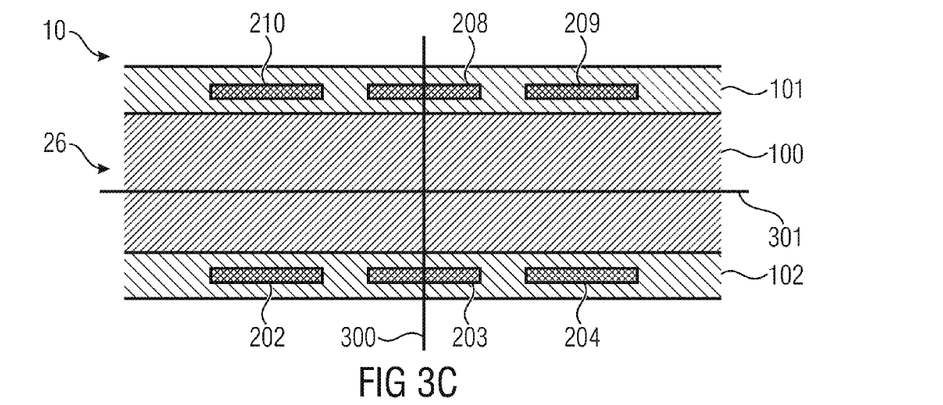
FIG. 3C illustrates eighth embodiment of an electro-optically induced waveguide according to the invention in a schematic cross sectional view.

FIG. 3C illustrates eighth embodiment of an electro-optically induced waveguide according to the invention in a schematic cross sectional view, which has a modified electrode arrangement 26. According to an embodiment of the invention the electrodes 202, 203, 204, 208, 209, 200 and are arranged in a cross sectional view symmetrically with respect to an axis 301 parallel to the core layer 100. By these features light wave propagation symmetrical with respect to the axis 301 parallel to the core layer 100 may be ensured.

The TE and TM mode profiles, i.e. shape and position are dependent on the electrical potential distribution across the waveguide, the electrode geometry and electro-optical constants. Embodiments of the present invention presented in FIGS. 3A-C show possible electrode arrangements 25, 22, 26 that can induce asymmetrical (FIG. 3A), symmetrical about one symmetry axis 300 (FIG. 3B) or about two symmetry axis 301 (FIG. 3C) TE and TM mode profiles.

Figure 4:
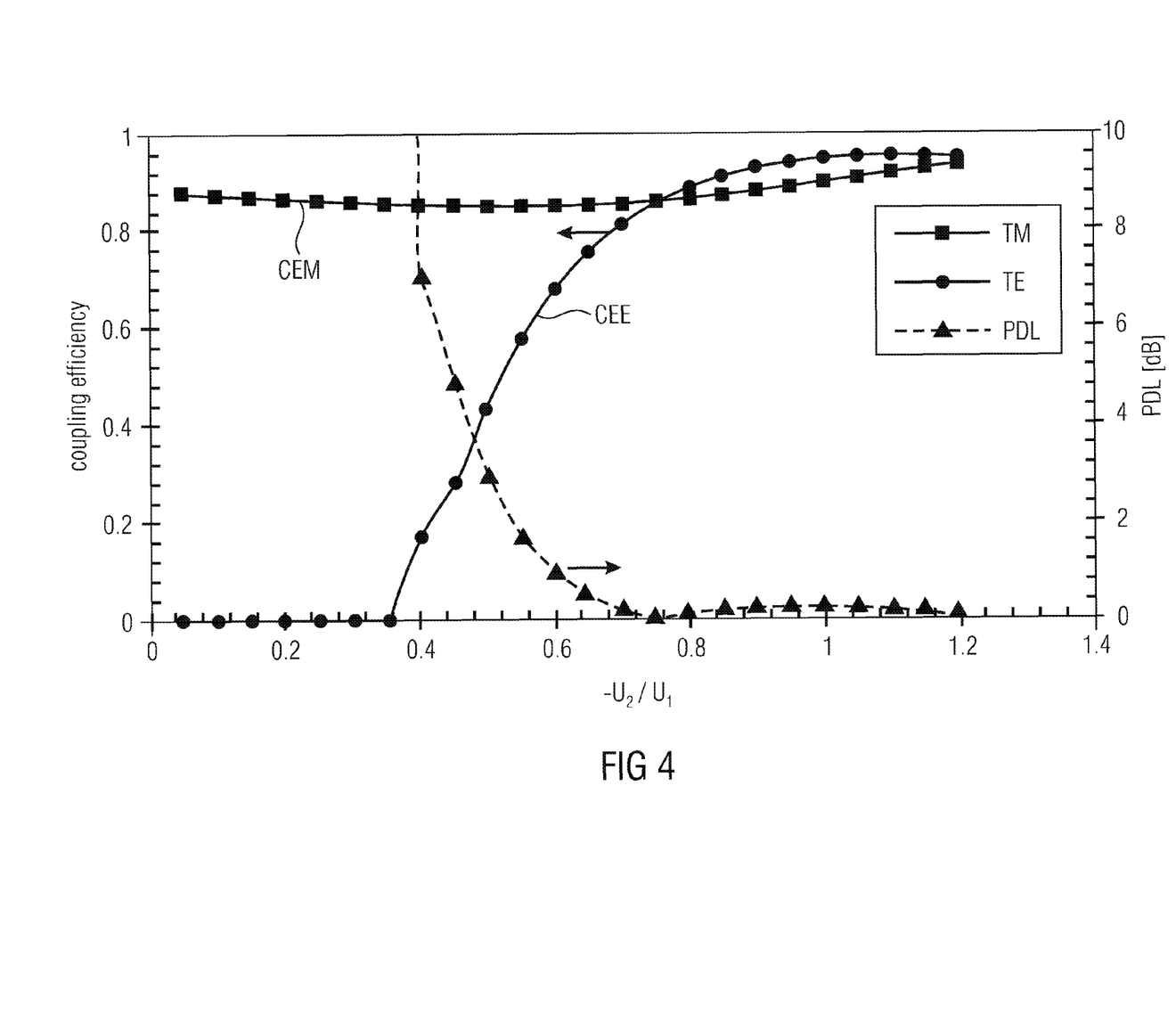
FIG. 4 shows a diagram illustrating the dependency of a polarization dependent loss as a function of the ratio of potentials applied to electrodes of the fourth embodiment.

FIG. 4 shows a diagram illustrating the dependency of a polarization dependent loss (PDL) as a function of the ratio of potentials applied on electrodes of the fourth embodiment. PDL is defined in the present invention and according to FIG. 4 as:

$$PDL = 10 \cdot \log\left(\frac{CE_{max}}{CE_{min}}\right) \quad (2)$$

where CE is the coupling efficiency. In particular FIG. 4 depicts the coupling efficiency CEE for the TE mode and the coupling efficiency CEM for TM modes, respectively the resulting polarization dependent loss PDL as a function of the ratio between the potential $U_2$ applied on the outer electrodes 202, 204 in FIG. 2C and the potential $U_1$ applied to the inner electrode 203 under the assumption of a core layer 100 made of an optically isotropic liquid and a normalized voltage of $U_1^2 s_{33}=0.12$ μm². The voltage on the electrodes 201 and 207 is kept at 0V.

Figure 5:
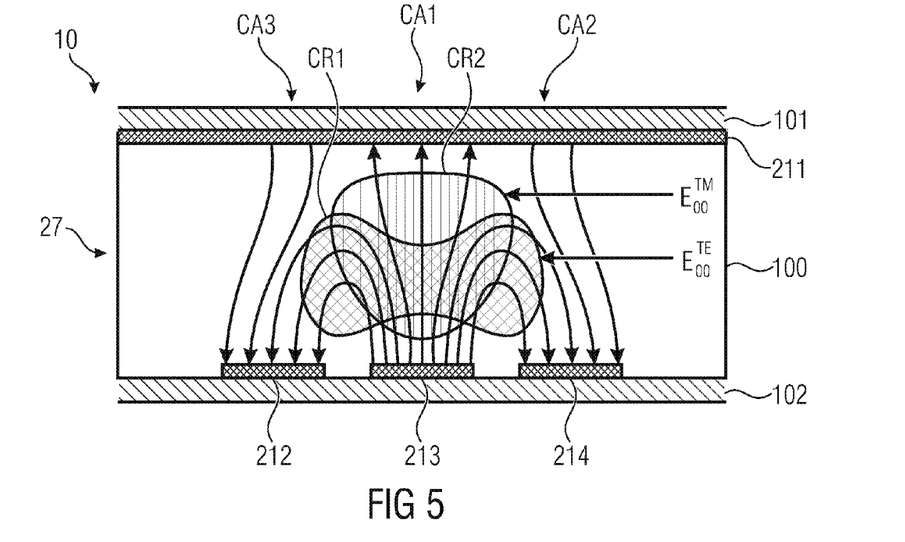
FIG. 5 illustrates ninth embodiment of an electro-optically induced waveguide according to the invention in a schematic cross sectional view.

FIG. 5 illustrates ninth embodiment of an electro-optically induced waveguide according to the invention in a schematic cross sectional view, which has a modified electrode arrangement 27. According to an embodiment of the invention at least one electrode 211-214 of the electrodes 201-217, advantageously all electrodes 201-217, are transparent electrodes 211-214, wherein at least one electrode 211 of the transparent electrodes 211-214, advantageously all transparent electrodes 211-214 are arranged directly adjacent to the core layer 100 and/or at least one electrode 212-214 of the transparent electrodes 211-214, advantageously all transparent electrodes 211-214 are arranged within the core layer 100.

Figure 6:
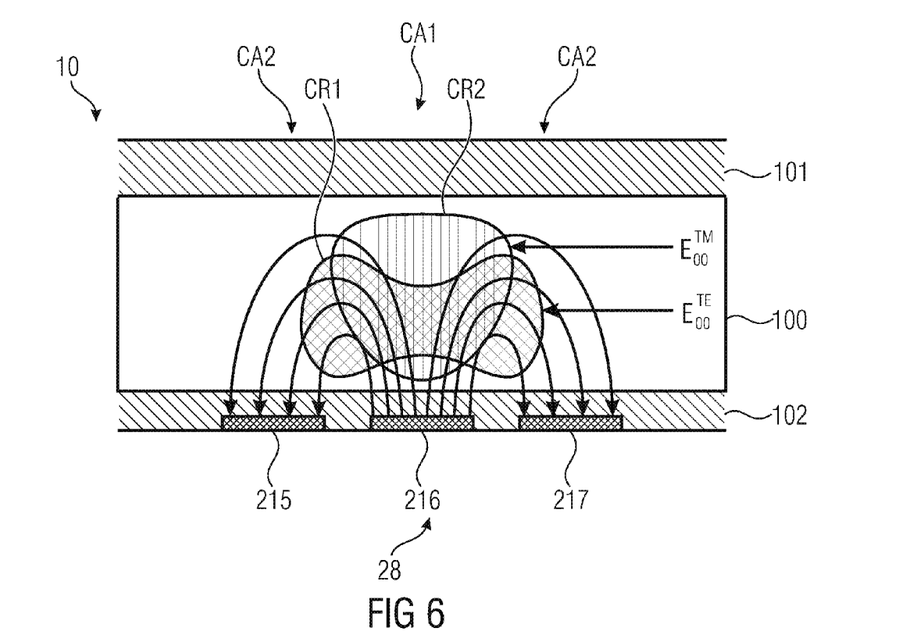
FIG. 6 illustrates tenth embodiment of an electro-optically induced waveguide according to the invention in a schematic cross sectional view.

FIG. 6 illustrates tenth embodiment of an electro-optically induced waveguide according to the invention in a schematic cross sectional view, which has a modified electrode arrangement 28. According to an embodiment of the invention all electrodes 215, 116, 217 are arranged on the same side of the core layer 100 invention in a cross sectional view. By this feature the waveguide 10 may be manufactured in an easy way.

Figure 7:
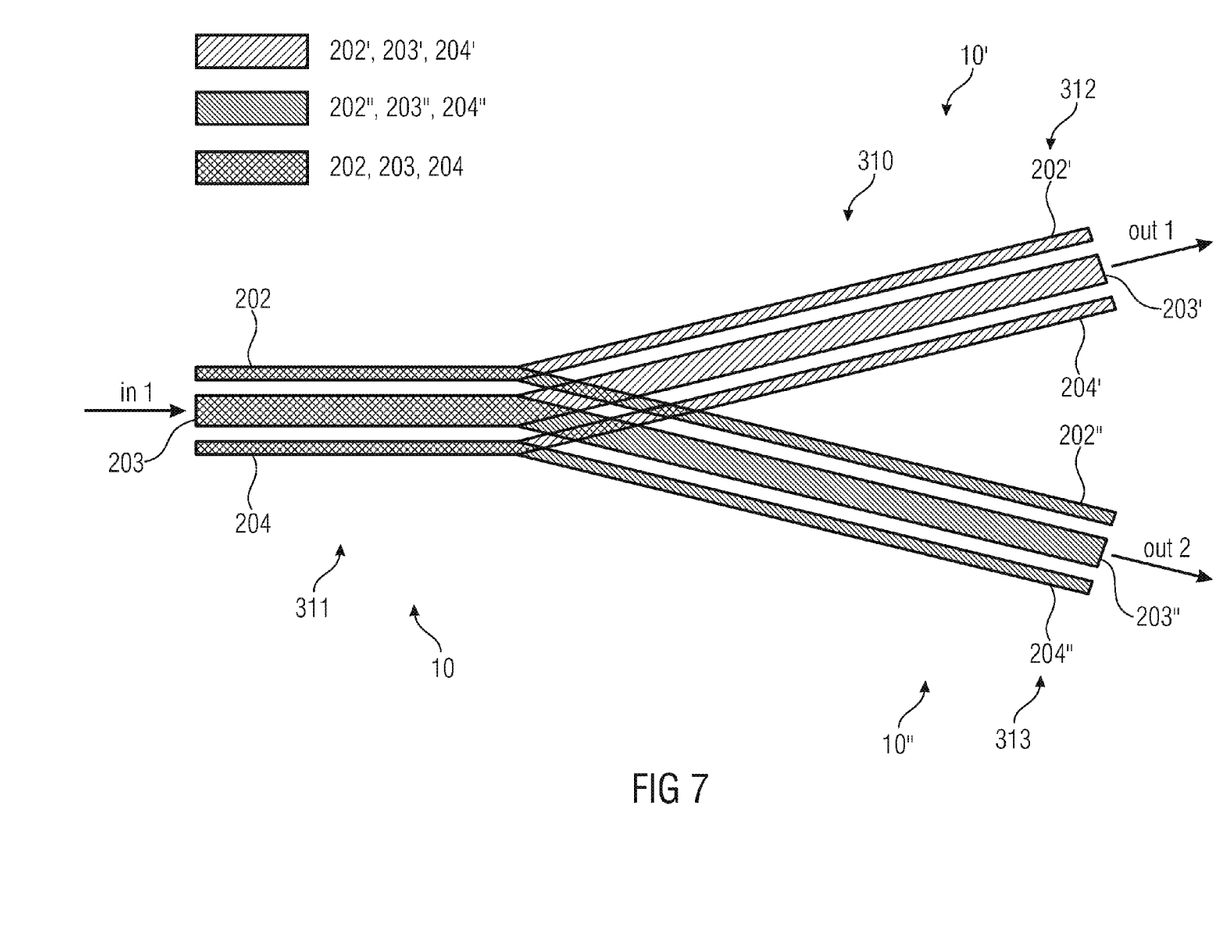
FIG. 7 illustrates an embodiment of a polarization independent 1×2 switch.

FIG. 7 illustrates an embodiment of a polarization independent 1×2 switch. One aspect of the invention relates to an electro-optical device 310 for optical telecommunication, fiber-optic sensor networks and/or spectroscopy, such as phase modulator, a polarization independent power or intensity modulator, a polarization filter, a polarization controller, a polarization independent n×m switch 300 and, a polarization independent n×m variable power splitter, a polarization independent multiplexer, a channel equalizer, a polarization independent de-multiplexer, wherein the electro-optical device comprises an electro-optically induced waveguide 10, 10', 10" according to the invention.

According to an embodiment of the invention the electro-optical device 310 is a polarization independent n×m switch 310, wherein at least one input path 311 comprises a first waveguide 10 according to the invention and wherein at least one output path 312, 313 comprises a further waveguide 10', 10" according to the invention. Herein n denotes the number of input paths and m the number of output paths.

The input path 311 comprises a waveguide 10 comprising electrodes 202, 203, 204 as shown in FIGS. 1C, 2B-D, 3A-C. The output path 312 comprises a waveguide 10' comprising electrodes 202', 203', 204' which are equivalent to the electrodes 202, 203, 204 shown in FIGS. 1C, 2B-D, 3A-C. The output path 313 comprises a waveguide 10" comprising electrodes 202", 203", 204" which are equivalent to the electrodes 202, 203, 204 shown in FIGS. 1C, 2B-D, 3A-C. FIG. 5 represents the top view of planar electrode arrangements 10, 10', 10" to be used in the design of a polarization independent 1×2 switch 310, with namely one input and two output channels. At least one additional counter electrode may be used, as depicted in any of the arrangements from FIGS. 1C, 2B-D, 3A-C. However, an arrangement without any counter electrode as shown in FIG. 6 may be used. Waveguiding occurs on a channel when voltage is applied on corresponding electrodes. More input and output channels can be realized by a cascade of polarization independent 1×2 switches (i.e. Y-branches). Furthermore, a polarization independent 1×2 variable power splitter may be realized with a similar arrangement of electrodes, hereby by a controlled variation of the voltage applied between electrodes corresponding to both channels.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

REFERENCES

[1] Costache, F. et al., "Apparatus and method for guiding optical waves", WO 2011/098130 A1.
[2] Jaeger, N. A. F. & Young, L., "Voltage-induced optical waveguide modulator in lithium niobate", IEEE Journal of Quantum Electronics, Vol. 25(4), 1989.
[3] Pyayt, A. et al., "Field-induced guiding optical devices made from electro-optic polymers", Applied Optics, Vol. 46(5), 2010.
[4] Channin, D., Voltage induced optical waveguide means, U.S. Pat. No. 3,795,433 A.
[5] Baken, N. "Electro-optically induced optical waveguide, and active devices comprising such a waveguide, U.S. Pat. No. 4,867,516 A.
[6] Jaeger, N. A. F. & Young, L., "Voltage-induced optical waveguide modulator having reduced inter-electrode gap", U.S. Pat. No. 4,807,952 A.
[7] Ramaswany, V. et al., "Switch for thin-film optics", U.S. Pat. No. 3,801,185 A.
[8] Diemeer, M., "Electro-optical component and method for making the same", U.S. Pat. No. 5,140,652 A.

What is claimed is:

1. An electro-optically induced waveguide comprising:
a waveguide layer stack comprising a core layer comprising an electro-optic material for guiding light waves; and
a field generator for generating an electrical field in the core layer, wherein the field generator comprises an electrode arrangement comprising a plurality of electrodes and a voltage supply arrangement for supplying at least two potentials to the electrode arrangement;
wherein the field generator is configured to induce an electro-optic effect by the generated electrical field in a first cross sectional region of the core layer such that a propagation of transverse-electric polarized light waves is enabled in the first cross sectional region;
wherein the field generator is configured to induce an electro-optic effect by the generated electrical field in a second cross sectional region of the core layer such that a propagation of transverse-magnetic polarized light waves is enabled in the second cross sectional region;
wherein the field generator is configured in such way that the coupling efficiency for of transverse-electric polarized light waves and the coupling efficiency for transverse-magnetic polarized light waves are equivalent; and
wherein the first cross sectional region and the second cross sectional region are overlapping in a cross sectional view.

2. The electro-optically induced waveguide according to claim 1, wherein field generator is configured in such way that in a cross sectional view the electrical field in a first cross sectional area of the core layer is orientated transverse to the waveguide layer stack, that the electrical field in a second cross sectional area of the core layer located in a first direction parallel to the waveguide layer stacks is orientated along the waveguide layer stack and that the electrical field in a third cross sectional area of the core layer located in a second direction opposite to the first direction and parallel to the waveguide layer stack is orientated along the waveguide layer stack.

3. The electro-optically induced waveguide according to claim 1, wherein one or more electrodes of the plurality of electrodes are transparent electrodes, wherein one or more of the transparent electrodes are arranged directly adjacent to the core layer and/or one or more of the transparent electrodes are arranged within the core layer.

4. The electro-optically induced waveguide according to claim 1, wherein one or more electrodes of the plurality of electrodes are planar and arranged parallel to the core layer.

5. The electro-optically induced waveguide according to claim 1, wherein in a cross sectional view the electrodes are arranged symmetrically with respect to an axis perpendicular to the core layer.

6. The electro-optically induced waveguide according to claim 1, wherein in a cross sectional view all electrodes are arranged on the same side of the core layer.

7. The electro-optically induced waveguide according to claim 1, wherein in a cross sectional view the electrodes are arranged symmetrically with respect to an axis parallel to the core layer.

8. The electro-optically induced waveguide according to claim 1, wherein the electrode arrangement comprises a group of three electrodes of said electrodes arranged in one layer, wherein a first potential of said potentials is applied to the one electrode of said three electrodes arranged in the middle and a second potential of said potentials is applied to the other two electrodes of the group.

9. The electro-optically induced waveguide according to claim 1, wherein the electrode arrangement comprises at least two electrodes of said electrodes arranged in different layers on the same side of the core layer, wherein the electrode facing away from the core layer comprises in a cross sectional view a larger extension in at least one direction parallel to the core layer than the electrode facing towards the core layer.

10. The electro-optically induced waveguide according to claim 1, wherein the electrode arrangement comprises at least two electrodes of said electrodes arranged in different layers on a first side of the core layer and at least two electrodes of said electrodes arranged in different layers on a second opposite side of the core layer, wherein the electrode facing away from the core layer comprise in a cross sectional view a larger extension in at least one direction parallel to the core layer than the electrode facing towards the core layer.

11. The electro-optically induced waveguide according to claim 1, wherein the electrode arrangement comprises a group of three electrodes of said electrodes, wherein each of the electrodes of the group is supplied with one of said potentials, wherein at least two of the potentials of the electrodes of the group are controllable, wherein a coupling efficiency for transverse-electric polarized light waves is a function of the two potentials and a coupling efficiency for transverse-magnetic polarized light waves is a function of the two potentials different from the function for the transverse-electric polarized light waves.

12. The electro-optically induced waveguide according to claim 1, wherein the core layer comprises thermotropic liquid crystals in their mesogenic state, thermotropic liquid crystals in their isotropic phase and their mixtures, polymer stabilized liquid crystals, cholesteric liquid crystals; crystals, ceramics and optoceramics, poled electro-optical polymers, side-chain polymers, and/or optically isotropic liquids.

13. The electro-optically induced waveguide according to claim 1, wherein the waveguide layer stack comprises a first cladding layer and a second cladding layer, wherein the core layer is arranged between the first cladding layer and the second cladding layer.

14. The electro-optically induced waveguide according to claim 13, wherein the core layer comprises a refractive index equal or higher than the first cladding layer and/or the second cladding layer.

15. The electro-optically induced waveguide according to claim 13, wherein the first cladding layer and/or the second cladding layer comprise an electro-optical material.

16. The electro-optically induced waveguide according to claim 13, wherein the first cladding layer and/or the second cladding layer comprise thermotropic liquid crystals in their mesogenic state, thermotropic liquid crystals in their isotropic phase and their mixtures, polymer stabilized liquid crystals, cholesteric liquid crystals; crystals, ceramics and optoceramics, poled electro-optical polymers, side-chain polymers, and/or optically isotropic liquids.

17. An electro-optical device for optical telecommunication, fiber-optic sensor networks and/or spectroscopy, wherein the electro-optical device comprises an electro-optically induced waveguide according to claim 1.

18. An electro-optical device for optical telecommunication, fiber-optic sensor networks and/or spectroscopy according to claim 17, wherein the electro-optical device is a polarization independent n×m switch, wherein at least one input path comprises a first waveguide according to claim 1 and wherein at least one output path comprises a further waveguide according to claim 1.

19. The electro-optically induced waveguide of claim 1, wherein the core layer propagates no light in the absence of the generated electrical field.

* * * * *